(12) United States Patent
Matz et al.

(10) Patent No.: US 11,504,874 B1
(45) Date of Patent: Nov. 22, 2022

(54) BREAD SLICER

(71) Applicant: Oliver Packaging and Equipment Company, Walker, MI (US)

(72) Inventors: Vance John Matz, Cedar Springs, MI (US); Yvonne M. Johnson, Rockford, MI (US); John Curtis Kortman, Muskegon, MI (US); Lorie Ann Morse, Grand Rapids, MI (US)

(73) Assignee: Oliver Packaging and Equipment Company, Walker, MI (US)

( * ) Notice: Subject to any disclaimer, the term of this patent is extended or adjusted under 35 U.S.C. 154(b) by 0 days.

(21) Appl. No.: 17/345,506

(22) Filed: Jun. 11, 2021

(51) Int. Cl.
*B26D 7/32* (2006.01)
*B26D 7/06* (2006.01)
*B26D 1/11* (2006.01)

(52) U.S. Cl.
CPC .............. *B26D 7/32* (2013.01); *B26D 1/11* (2013.01); *B26D 7/0608* (2013.01); *B26D 2007/327* (2013.01); *B26D 2210/06* (2013.01)

(58) Field of Classification Search
CPC . B26D 7/32; B26D 1/11; B26D 1/553; B26D 7/0608; B26D 7/06; B26D 2210/06; B26D 2007/327; B26D 5/00
USPC .............................. 83/418, 425.2, 437.2, 932
See application file for complete search history.

(56) References Cited

U.S. PATENT DOCUMENTS

| | | | | |
|---|---|---|---|---|
| 1,993,466 A | * | 3/1935 | Van Berkel | B26D 7/0608 83/411.6 |
| 2,092,857 A | * | 9/1937 | Poulin | B26D 7/0608 83/431 |
| 2,379,911 A | | 7/1945 | Kottmann | |
| 2,528,853 A | * | 11/1950 | Brustowsky | B26D 5/18 83/751 |
| 4,686,875 A | * | 8/1987 | Rijkaart | B26D 7/0608 83/425.2 |
| 7,987,757 B2 | | 8/2011 | Willett | |

FOREIGN PATENT DOCUMENTS

| | | |
|---|---|---|
| CN | 202640443 U | 1/2013 |
| DE | 102008025628 B3 | 12/2009 |
| DE | 102010036721 B4 | 2/2012 |
| EP | 1319481 B1 | 6/2003 |
| EP | 3632635 A1 | 4/2020 |
| RU | 2679701 C1 | 2/2019 |

* cited by examiner

*Primary Examiner* — Nhat Chieu Q Do
(74) *Attorney, Agent, or Firm* — McNees Wallace & Nurick

(57) ABSTRACT

A bread slicer includes an infeed side and a hollow infeed assembly positioned in the infeed side, the infeed assembly having an open end and a closed end defining a chamber for receiving bread to be sliced. The bread slicer further includes a pusher for pushing the bread to be sliced along the infeed assembly, and a linkage connected to the pusher, the linkage adapted to move the infeed assembly from a bread receiving position to a predetermined position of a bread path, the linkage adapted to then move the pusher and the bread to be sliced along the bread path from the predetermined position to a delivery area. The bread slicer further includes slicing blades having sharp edges to slice bread moving along the bread path.

19 Claims, 4 Drawing Sheets

_US 11,504,874 B1_

BREAD SLICER

FIELD OF THE INVENTION

The present invention is directed to bread slicers, and specifically to bread slicers for enhancing operator experience while operating the bread slicer.

BACKGROUND OF THE INVENTION

Bread slicers, such as are widely used in eating establishments that serve sliced bread, utilize a plurality of closely spaced slicer blades for slicing the bread loaves into individual slices. Bread slicers utilize different arrangements to help protect operators' hands during slicing operations. However, such arrangements do not effectively prevent potential incidental contact with the stationary blades while loading the bread into the slicer. In addition, many manually operated slicers are typically arranged such that operators must access a control with one hand, while attempting to load bread to be sliced into another part of the slicer with the other hand, which is cumbersome.

There is a need in the art for bread slicers that enhance the operators' experience.

SUMMARY OF THE INVENTION

In one embodiment, a bread slicer includes an infeed side and a hollow infeed assembly positioned in the infeed side, the infeed assembly having an open end and a closed end defining a chamber for receiving bread to be sliced. The bread slicer further includes a pusher for pushing the bread to be sliced along the infeed assembly, and a linkage connected to the pusher, the linkage adapted to move the infeed assembly from a bread receiving position to a predetermined position of a bread path, the linkage adapted to then move the pusher and the bread to be sliced along the bread path from the predetermined position to a delivery area. The bread slicer further includes slicing blades having sharp edges to slice bread moving along the bread path.

In another embodiment, a bread slicer includes an infeed side, and a hollow infeed assembly positioned in the infeed side, the infeed assembly having an open end and a closed end defining a chamber for receiving bread to be sliced. The bread slicer further includes a pusher for pushing the bread to be sliced along the infeed assembly, and a linkage having a single selectively variable input source connected to the pusher, the linkage adapted to move the infeed assembly from a bread receiving position to a predetermined position of a bread path, the linkage adapted to then move the pusher and the bread to be sliced along the bread path from the predetermined position to a delivery area. The bread slicer further includes slicing blades having sharp edges to slice bread moving along the bread path, and a holder adapted to secure the bread in contact with a support surface of the bread path during bread slicing.

In yet another embodiment, a bread slicer includes an infeed side, and a hollow infeed assembly positioned in the infeed side, the infeed assembly having an open end and a closed end defining a chamber for receiving bread to be sliced. The bread slicer further includes a linkage connected to the infeed assembly, the linkage adapted to move the infeed assembly from a bread receiving position to a predetermined position of a downward bread path, the bread to be sliced moving by force of gravity along the downward bread path from the predetermined position to a delivery area. The bread slicer further includes slicing blades having sharp edges to slice bread moving along the downward bread path.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
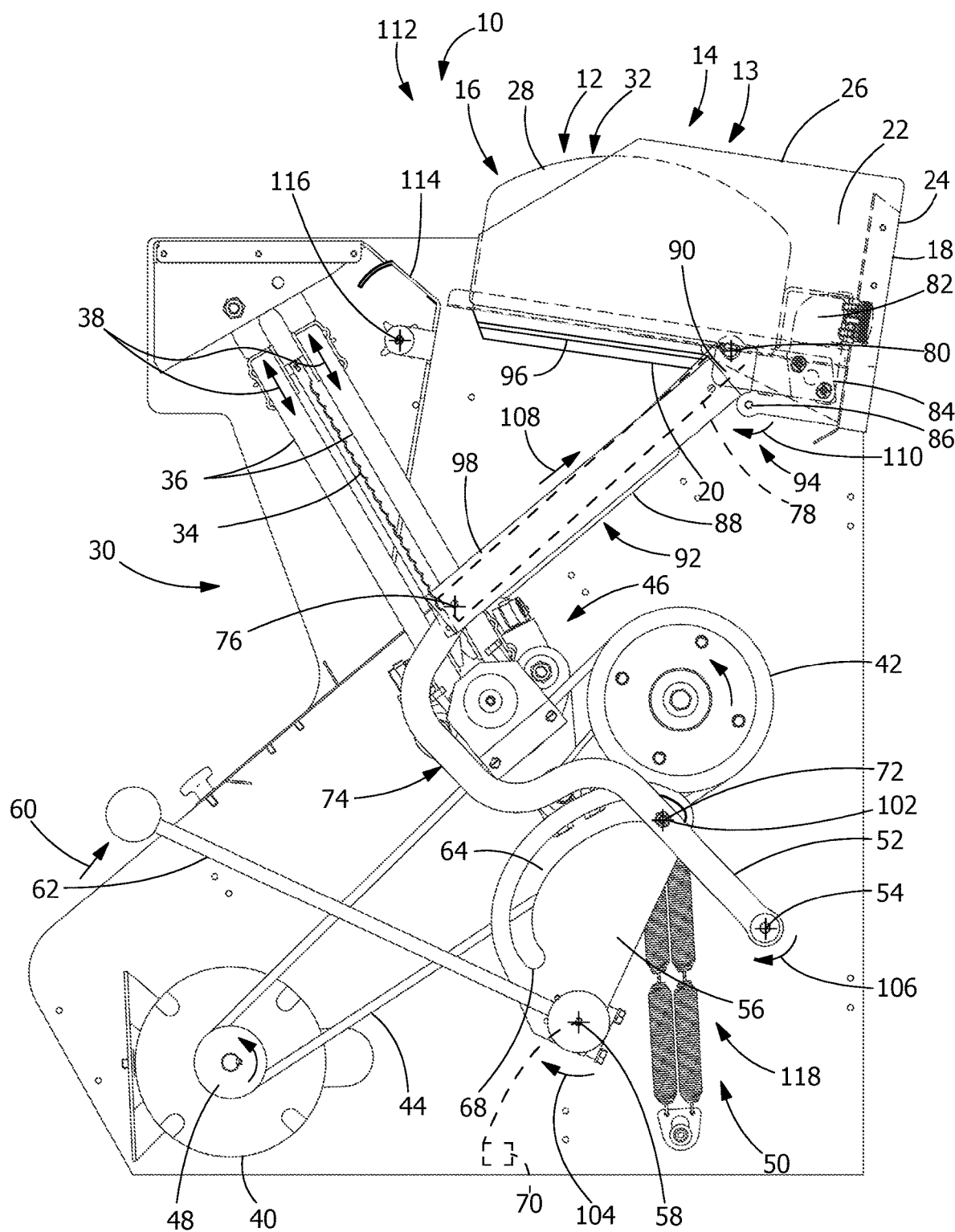
FIGS. 1-4 are sequential schematic views of an exemplary bread slicer showing different operational positions of a linkage connected to an infeed assembly.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

As schematically shown in FIGS. 1-4, the present invention includes a bread slicer 10 that is adapted to guard against access to the slicing blades, but especially while bread is being loaded into the bread slicer, an operator (e.g., the operator's hands) from contacting the sharp edges of the slicing blades from an infeed side 12 of the bread slicer. In one embodiment, such access is prevented at all times, such as by the arrangement of bread slicer components. More specifically, as shown in FIG. 1, bread slicer 10 includes infeed side 12 that extends to a downward bread path 30 containing bread slicing blades 34 positioned in blade cartridges 36 that are urged into reciprocating movement 38 by a motor 40, and an optional immobilizer or holder 114 such as a pivoting plate, a horizontal plate selectively positioned above a support surface or other suitable arrangement adapted to secure the bread in contact with the support surface of the bread path during bread slicing, although in one embodiment, the holder may not be required, and operator access to the bread slicing blades may be guarded such as by suitably extending portions of the infeed assembly, for example. That is, motor 40 drivingly rotates a motor pulley 48 which engages another pulley 42 via an endless drive belt 44 for similarly urging pulley 42 into rotational movement for then urging a drive linkage 46 into a corresponding movement such as a reciprocating movement, resulting in reciprocating movement 38 of the corresponding blade cartridges and blades 36, 34. Positioned in infeed side 12 is a an infeed assembly 13 including a hollow infeed platform 14 having an open end 16, an opposed closed end 18, a support surface 20 for supporting bread 28, opposed side walls 22, 24 extending upwardly from support surface 20, and a top 26 positioned between and interconnecting sidewalls 22, 24 opposite support surface 20. Closed end 18, support surface 20, sidewalls 22, 24, and top 26 collectively define a chamber 32 for receiving bread 28 by an operator (not shown) to be sliced by slicing blades.

For purposes herein, the term "bread" is intended to include any of a portion of a loaf of bread, a full loaf, or more than a full loaf, including multiple loaves, as appropriate or desired by the operator for loading into the infeed platform of the bread slicer for slicing.

Returning to FIG. 1, bread slicer 10 includes a novel linkage 50 that is now discussed that prevents, at all times, an operator (e.g., the operators' hands) from contacting the sharp edges of slicing blades 34 from infeed side 12 of bread slicer 10. As shown, linkage 50 includes a plurality of fixed length members, such as a linkage member 52 that rotates about a pivot 54, and a linkage member 56 that rotates about a pivot 58. As shown, linkage member 56 receives input for actuating or moving linkage 50 from a single selectively variable input source 60 such as a force applied by an operator (not shown) to an end of a lever 62, resulting in a torsion force applied at pivot 58 (e.g., perpendicular component of force 60 relative to lever 62 multiplied by the length of lever 62). In another embodiment, the force may be a torsion force applied to pivot 58 by a motor 70. As shown, lever 62 is affixed to linkage member 56 such as to pivot 58, with linkage member 56 being a cam plate and having a curved slot 64 formed therein and extending between opposed slot ends 66, 68. Linkage 50 includes a common pivot or pivot 72 between linkage members 52, 56 that is constrained to follow the path of curved slot 64. Linkage member 52 extends from pivot 54 past pivot 72 and then along a curved portion 74 formed in linkage member 52 to avoid contacting drive linkage 46, terminating at a pivot 76 that is pivotably connected to a linkage member 78, which linkage member 78 terminating at a pivot 80 of a pusher 82 operatively connected to and included as part of infeed platform 14, which pusher 82 for pushing bread 28 to be sliced along infeed platform 14. In one embodiment, linkage members 52, 78 may be a single linkage member, so long as the single linkage member is sufficiently flexible to permit rotation of infeed platform 14 relative to bread path 30, as well as driven movement of pusher 82 along infeed platform 14, depending upon the position of pivot 72 along slot 64, as will be discussed in further detail below.

Returning to FIG. 1, the rotation of infeed platform 14 relative to bread path 30 as a result of actuation of linkage 50 is now discussed. Infeed platform 14 includes a block 84 affixed thereto, which block 84 including a pivot 86 defining a pivotable connection between infeed platform 14 and bread slicer structure 88. Pusher 82 also includes pivot 80 defining either a pivotable connection between pusher 82 and linkage member 78, or a sliding connection between pusher 82 and infeed platform 14, which corresponding pivotable movement or sliding or translational movement depending upon the location of pivot 72 of linkage 50, the direction of the pivotable movement and sliding movement depending on the direction of force 60 applied to lever 62 of linkage 50 (i.e., resulting in clockwise or counterclockwise rotational movement of lever 62 about pivot 58). Pusher 82 includes a bearing or slide block 90 that slides in a channel 92 formed in bread slicer structure 88 and a channel 96 formed in support surface 20 of infeed platform 14, which channel 92 including an upward pivoting portion 94.

A full cycle of movement of linkage 50 is defined by the position of pivot 72 along curved slot 64, and will be described starting at slot end 66 and ending at slot end 68 in response to force 60 being applied to lever 62.

As shown in FIG. 1, with pivot 72 at slot end 66, support surface 20 of infeed platform 14 is in contact with and supported by surface 98 of bread slicer structure 88, with infeed platform 14 positioned in a predetermined position 100 (FIG. 2) of bread path 30. (For purposes of clarity, infeed platform 14 is positioned at predetermined position 100 (FIG. 2) at multiple positions of pivot 72 along slot 64, as will be discussed in additional detail below.) As further shown in FIG. 1, and as a result of an operator (not shown) applying force 60 to end of lever 62 opposite pivot 58, lever rotates about pivot 58 in a rotational movement direction 104, and pivot 72 is constrained to move from slot end 66 to slot position 102 along slot 64, resulting in linkage member 52 being urged to rotate about pivot 54 in a rotational movement direction 106, further resulting in pivot 76 of linkage member 52 applying a force along linkage member 78 to pivot 80 in direction 108. In response to linkage member 78 applying a force in direction 108 to pivot 80 of infeed platform 14 positioned at pivoting portion 94 of channel 92, infeed platform 14 is urged to rotate in rotational movement direction 110 about pivot 86, which infeed platform 14 rotating from predetermined position 100 (FIG. 2) of bread path 30 to a bread receiving position 112, permitting the operator to insert bread 28 through open end 16 and into chamber 32 of infeed platform 14. Optionally, one or more springs 118 may be used to assist the operator with actuating lever 62. That is, spring(s) 118 may to utilized to reduce the magnitude of force 60 the operator needs to apply to the end of lever 62 to actuate linkage 50. In one embodiment, linkage 50 is configured such that the magnitude of force applied by spring(s) 118 to linkage 50 is zero when pivot 72 is at slot position 102, which slot position 102 also corresponding to bread receiving position 112 of infeed platform 14. By configuring spring(s) 118 to apply a zero load to linkage 50 at bread receiving position 112 of infeed platform 14, the position of lever 62 is inherently stable, as actuation of linkage 50 to a position away (in either rotational direction) from this position of the linkage corresponding to infeed platform 14 at bread receiving position 112 would result in spring(s) 118 applying a force resisting linkage actuation, permitting, if desirable, for the operator to use both hands to load bread in infeed platform 14 in infeed side 12 of the bread slicer, without concern of the operator's hands contacting blades 34, or without concern of lever 62 inadvertently moving away from its position. Stated another way, in this position, linkage 50 is configured to include a neutral position when infeed platform 14 is in bread receiving position 112, spring(s) 118 applying a zero force to lever 62 when infeed platform 14 is in bread receiving position 112. Moreover, permitting the operator to use both hands to load bread in infeed platform 14 in infeed side 12 is much easier to load, providing an operator with a more ergonomically friendly arrangement.

Figure 2:
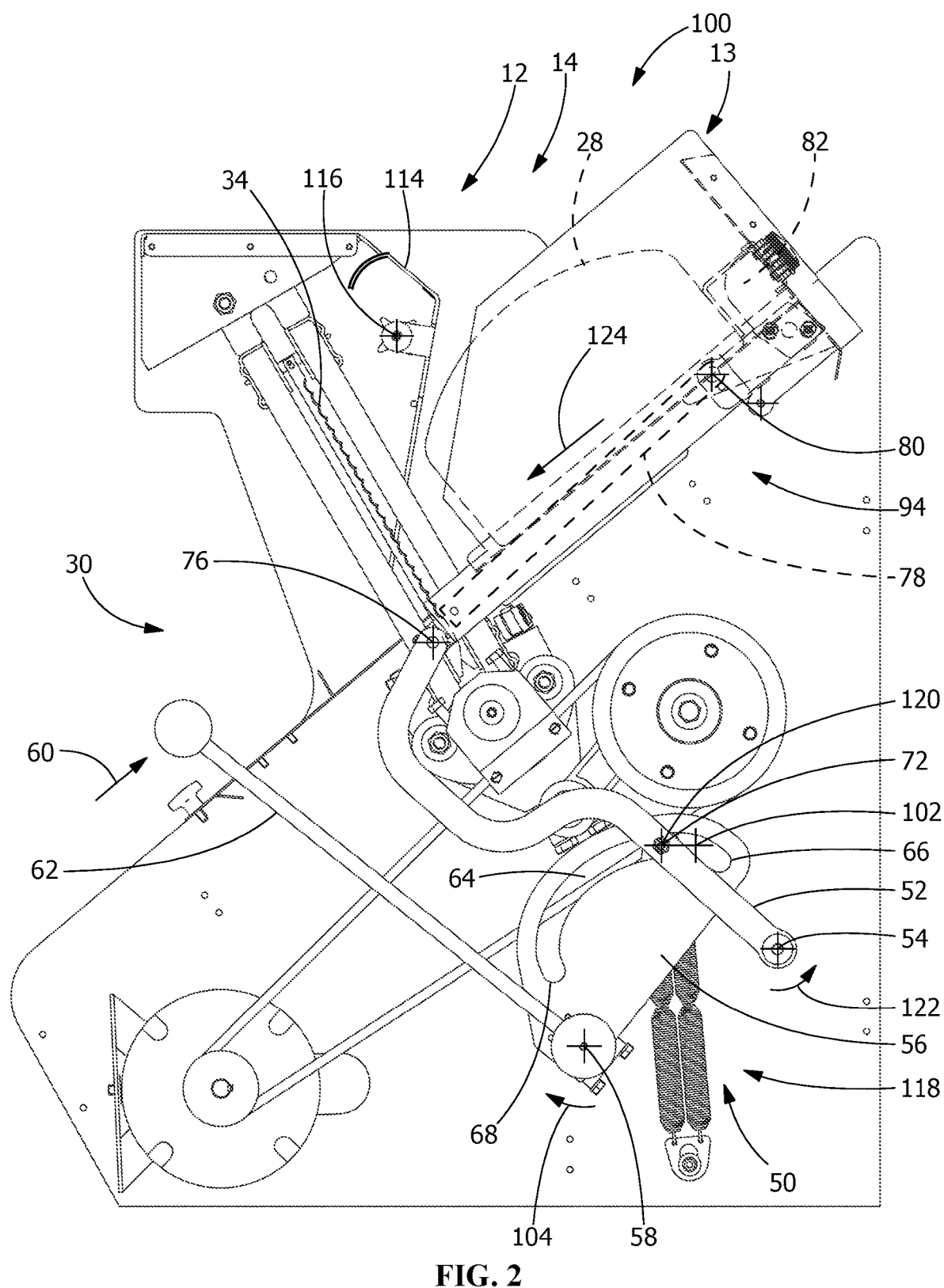

At all times, i.e., any positions of infeed platform 14 between predetermined position 100 (FIG. 2) and bread receiving position 112, infeed side 12 is adapted to prevent an operator from contacting the sharp edges of the slicing blades 34 therefrom, providing enhanced safety for the operator. That is, for example (as shown in FIG. 2), when infeed platform 14 is in predetermined position 100, a combination of infeed platform 14 and a pivoting plate 114 having a pivot 116 prevent an operator from contacting the sharp edges of the slicing blades 34 therefrom. Additionally, when infeed platform 14 is in bread receiving position 112 (as shown in FIG. 1), a combination of infeed platform 14 and pivoting plate 114 having a pivot 116 prevent an operator from contacting the sharp edges of the slicing blades 34 from infeed side 12. Optionally, infeed platform 14 and pivoting plate 114 may be configured such that only infeed platform 14 is needed to prevent an operator from contacting the sharp edges of the slicing blades 34 from infeed side 12 for either or both of predetermined position 100 (FIG. 2) and bread receiving position 112.

Subsequent to pivot 72 being at slot position 102 (FIG. 1) with linkage 50 rotating infeed platform 14 to bread receiving position 112, in response to selectively variable input source force 60 being further sufficiently applied to the end of lever 62, pivot 72 is urged to move past slot position 102 in a direction away from slot 66 of slot 64, resulting in a rotational movement of linkage member 52 opposite rotational movement 106 about pivot 54, thereby resulting in linkage member 52 applying a force at pivot 76 to linkage member 78 in a direction opposite direction 108, ultimately resulting in rotating infeed platform from bread receiving position 112 to predetermined position 100 (FIG. 2).

FIG. 2 shows linkage 50 with pivot 72 constrained to move yet further along slot 64 of linkage member 56 after infeed platform rotates to predetermined position 100. That is, in response to selectively variable input source force 60 being yet further sufficiently applied to the end of lever 62, pivot 72 is moved past slot position 102 to slot position 120 of slot 64 of linkage member 56 in a direction away from slot end 66 of slot 64, resulting in a rotational movement 122 of linkage member 52 about pivot 54, thereby resulting in linkage member 52 applying a force at pivot 76 to linkage member 78 in a direction 124 and then linkage member 78 at pivot 80 applying a force in direction 124 to pusher 82, resulting in beginning of movement of pusher 82 and bread 28 along infeed platform 14 along bread path 30.

Figure 3:
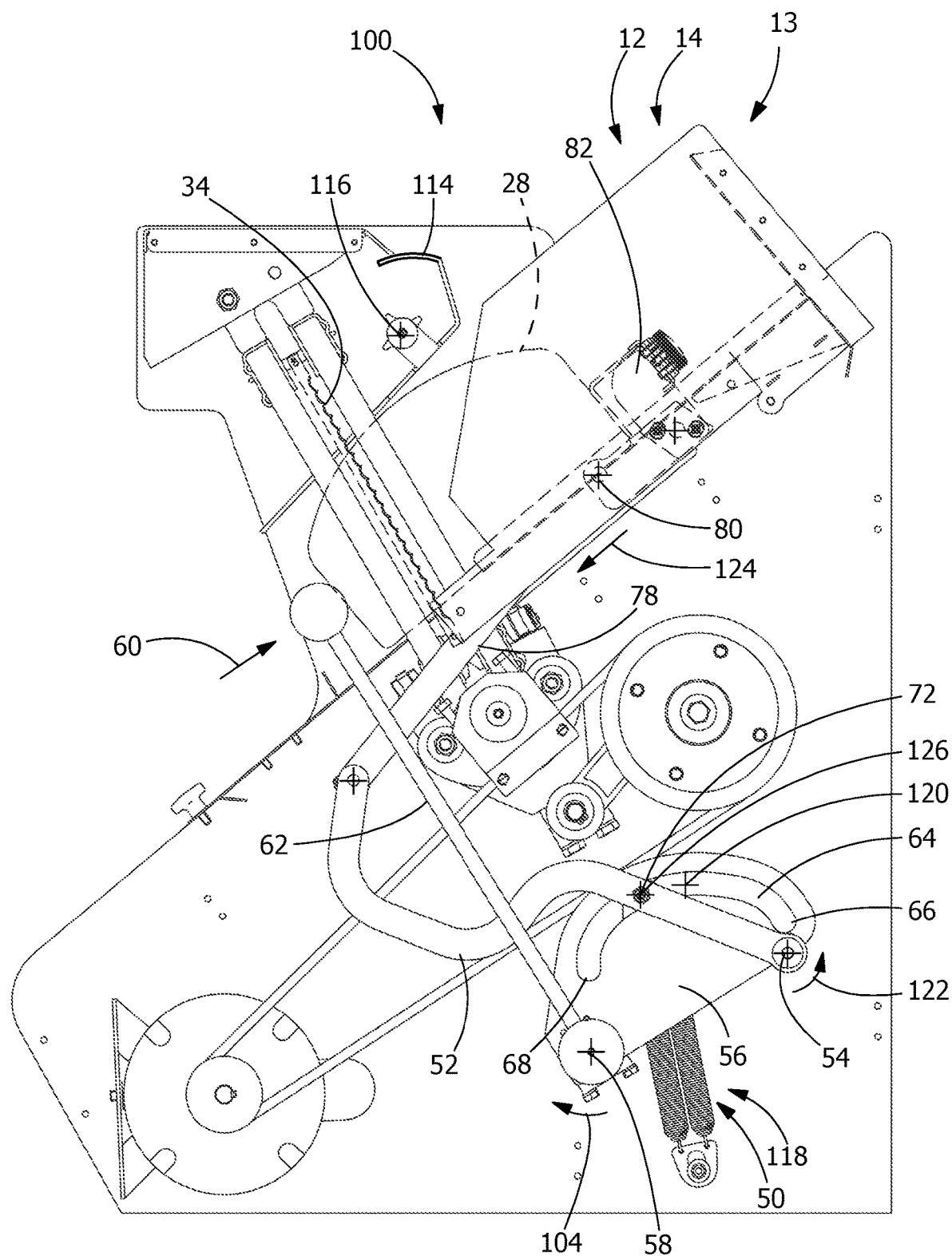

FIG. 3 shows linkage 50 with pivot 72 constrained to move further along slot 64 of linkage member further urging pusher 82 and bread 28 along bread path 30 and into blades 34 for slicing the bread. That is, in response to selectively variable input source force 60 being yet further sufficiently applied to the end of lever 62, pivot 72 is urged to move past slot position 120 to slot position 126 of slot 64 of linkage member 56 in a direction away from slot end 66 of slot 64, resulting in a rotational movement 122 of linkage member 52 about pivot 54, thereby resulting in linkage member 52 applying a force at pivot 76 to linkage member 78 in a direction 124 and then linkage member 78 at pivot 80 applying a force in direction 124 to pusher 82, resulting in further movement of pusher 82 and bread 28 along infeed platform 14 along bread path 30 and into blades 34 for slicing bread 28.

Figure 4:
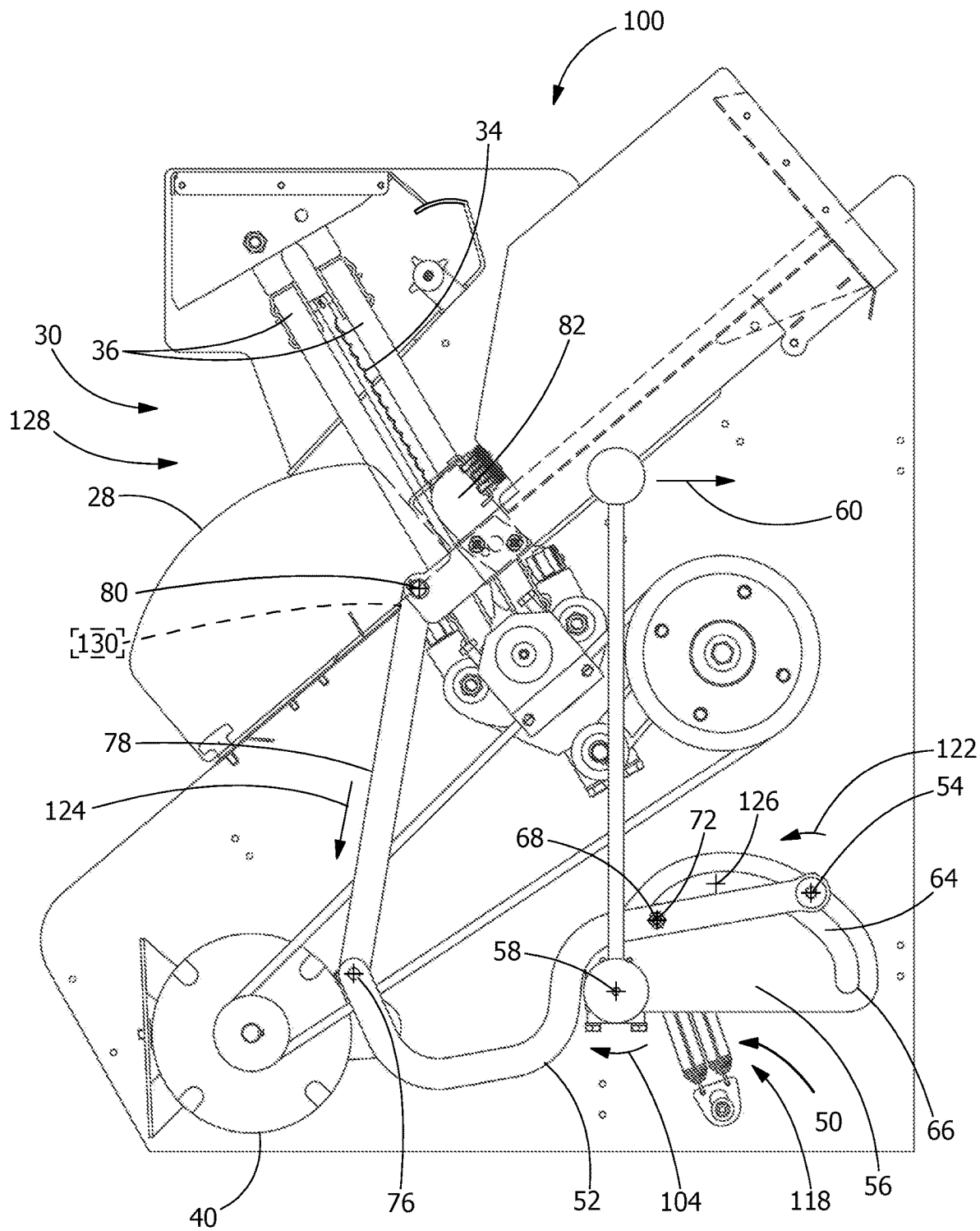

FIG. 4 shows linkage 50 with pivot 72 constrained to move further along slot 64 of linkage member further urging pusher 82 and bread 28 along bread path 30, through blades 34 for slicing the bread, and further moving the bread into a delivery area 128. That is, in response to selectively variable input source force 60 being yet further sufficiently applied to the end of lever 62, pivot 72 is urged to move past slot position 126 to slot end 68 of slot 64 of linkage member 56 in a direction away from slot 66, resulting in a rotational movement 122 of linkage member 52 about pivot 54, thereby resulting in linkage member 52 applying a force at pivot 76 to linkage member 78 in a direction 124 and then linkage member 78 at pivot 80 applying a force in direction 124 to pusher 82, resulting in further movement of pusher 82 and bread 28 along infeed platform 14 along bread path 30, through blades 34 slicing bread 28, and moving bread 28 to delivery area 128. Upon bread 28 being delivered to delivery area 128, a switch 130 is actuated, shutting off power to motor 40, similarly resulting in discontinuing movement of blades 34.

Applying a reverse force opposite the direction of force 60 may be used to reset linkage 50, returning the slot position of pivot 72 to slot end 66 of slot 64 of linkage member 56 to repeat the operating cycle.

In one embodiment, bread path 30 is gravity fed. That is, the downward slope of bread path 30 is of sufficient magnitude such that the force of gravity is sufficient without a pusher 82 to urge bread 28 from predetermined position 100 (FIG. 2) of bread path 30 along bread path 30, through blades 34 for slicing the bread, and further moving the bread into delivery area 128. In one embodiment, bread path 30 may be generally horizontal, requiring pusher 82 for moving bread 28 along bread path 30, through blades 34 for slicing the bread, and further moving the bread into delivery area 128. In one embodiment, bread path 30 may be oriented at an incline, which includes any angle greater than zero degrees above a horizontal reference position, up to and including a vertical position or 90 degrees above the horizontal reference position, requiring a pusher 82 for moving bread 28 along bread path 30, through blades 34 for slicing the bread, and further moving the bread into delivery area 128.

In one embodiment, a motor (not shown) may be installed at pivot 54, and replace both the lever and cam plate, but would require more sophisticated electronic controls.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A bread slicer, comprising:
    an infeed side;
    a hollow infeed assembly positioned in the infeed side, the infeed assembly having an open end and a closed end defining a chamber for receiving bread to be sliced;
    a pusher for pushing the bread to be sliced along the infeed assembly;
    a linkage connected to the pusher, the linkage adapted to move the infeed assembly from a bread receiving position to a predetermined position of a bread path, the linkage adapted to then move the pusher and the bread to be sliced along the bread path from the predetermined position to a delivery area, the linkage includes a first linkage member and a second linkage member that rotates about a common pivot and constrained to follow a path of a slot formed in the first linkage member, wherein the first linkage member includes a cam plate; and slicing blades having sharp edges to slice bread moving along the bread path.

2. The bread slicer of claim 1, further comprises a holder adapted to secure the bread in contact with a support surface of the bread path during bread slicing, wherein a combination of the holder and the infeed assembly are adapted to prevent an operator from contacting the sharp edges of the slicing blades from the infeed side.

3. The bread slicer of claim 1, wherein the infeed assembly pivots between the bread receiving position and the predetermined position of the bread path.

4. The bread slicer of claim 1, wherein the linkage has a single selectively variable input source.

5. The bread slicer of claim 4, where the single selectively variable input source is a torsion force.

6. The bread slicer of claim 5, wherein the torsion force is generated by a motor.

7. The bread slicer of claim 5, where the torsion force is generated by a perpendicular force applied to a lever.

8. The bread slicer of claim 7, wherein the lever is affixed to the cam plate.

9. The bread slicer of claim 7, wherein a spring is connected to the linkage to assist with a lever actuation.

10. The bread slicer of claim 9, wherein the linkage is configured to be in a neutral position when the infeed assembly is in the bread receiving position.

11. The bread slicer of claim 1, wherein the slot formed in the first linkage member is curved.

12. The bread slicer of claim 1, wherein in response to a force applied by a single selectively variable input source, the common slot is constrained to move away from one end along the slot, resulting in the second linkage member being urged to rotate about a pivot.

13. The bread slider of claim 12, further comprising a third linkage member connected to the second linkage member, wherein in response to the second linkage member being rotated, the third linkage member pivots to urge an infeed platform of the infeed assembly to rotate to the predetermined position of the bread path.

14. A bread slicer, comprising:
an infeed side;
a hollow infeed assembly positioned in the infeed side, the infeed assembly having an open end and a closed end defining a chamber for receiving bread to be sliced;
a pusher for pushing the bread to be sliced along the infeed assembly;
a linkage having a single selectively variable input source connected to the pusher, the linkage adapted to move the infeed assembly from a bread receiving position to a predetermined position of a bread path, the linkage adapted to then move the pusher and the bread to be sliced along the bread path from the predetermined position to a delivery area, wherein when a force is applied to the single selectively variable input source, a common pivot formed in a first linkage member of the linkage is urged to move away from a slot end of an elongated curved slot formed in a second linkage member of the linkage, resulting in a rotational movement of the linkage about a pivot; and
slicing blades having sharp edges to slice bread moving along the bread path; and
a holder adapted to secure the bread in contact with a support surface of the bread path during bread slicing.

15. The bread slicer of claim 14, wherein the linkage comprises a cam plate.

16. The bread slicer of claim 14, wherein the infeed assembly pivots between the bread receiving position and the predetermined position of the bread path.

17. The bread slicer of claim 14, wherein a spring is connected to the linkage to assist with a lever actuation.

18. The bread slicer of claim 17, wherein the linkage is configured to be in a neutral position when the infeed assembly is in the bread receiving position.

19. A bread slicer, comprising:
an infeed side;
a hollow infeed assembly positioned in the infeed side, the infeed assembly having an open end and a closed end defining a chamber for receiving bread to be sliced;
a linkage connected to the infeed assembly, the linkage adapted to move the infeed assembly from a bread receiving position to a predetermined position of a downward bread path, the bread to be sliced urged to move by force of gravity along the downward bread path from the predetermined position to a delivery area, the linkage includes a common pivot of a first linkage member that is constrained to follow a path of an elongated curved slot formed in a second linkage member and adapted to move the infeed assembly along the bread path; and
slicing blades having sharp edges to slice bread moving along the downward bread path.

* * * * *